United States Patent [19]

Grandle, Jr.

[11] 4,153,944
[45] May 8, 1979

[54] METHOD AND ARRANGEMENT FOR BUFFERING DATA

[75] Inventor: James A. Grandle, Jr., Marlboro, N.J.

[73] Assignee: Bell Telephone Laboratories, Incorporated, Murray Hill, N.J.

[21] Appl. No.: 414,763

[22] Filed: Nov. 12, 1973

[51] Int. Cl.² .................... G06F 7/00; G06F 13/06
[52] U.S. Cl. ................................................ 364/900
[58] Field of Search ............. 340/172.5; 444/1; 364/900 MS File, 200 MS File

[56] References Cited

U.S. PATENT DOCUMENTS

| Re. 27,119 | 4/1971 | Seeber, Jr. | 340/172.5 |
|---|---|---|---|
| 3,106,698 | 10/1963 | Unger | 364/200 |
| 3,356,993 | 12/1967 | Sharp | 340/172.5 |
| 3,371,320 | 2/1968 | Lachenmayer | 340/172.5 |
| 3,399,383 | 8/1968 | Armstrong | 340/172.5 |
| 3,439,342 | 4/1969 | Barton | 364/900 |
| 3,505,653 | 4/1970 | Kautz | 340/172.5 |
| 3,513,448 | 5/1970 | Armstrong | 340/172.5 |
| 3,514,760 | 5/1970 | Kautz | 340/172.5 |
| 3,573,744 | 4/1971 | Rigazio | 340/172.5 |
| 3,699,534 | 10/1972 | Kautz | 340/172.5 |
| 3,760,368 | 9/1973 | Dailey | 340/172.5 |
| 3,763,472 | 10/1973 | Sharp | 340/172.5 |

Primary Examiner—James D. Thomas
Attorney, Agent, or Firm—Ronald D. Slusky

[57] ABSTRACT

A method and arrangement for buffering N data sources using $(N^2+N)/2$ data buffer cells which may be conceptually regarded as being arranged in a right triangle configuration. Cells to be unloaded and then reloaded during each buffer cycle are located by going across a row of cells and then down the column of cells including the last cell of the row. The data buffering method may be performed by apparatus specifically designed for that purpose or by an appropriately programmed general purpose digital computer.

1 Claim, 13 Drawing Figures

FIG. 3, FIG. 4, FIG. 5, FIG. 6, FIG. 7, FIG. 8, FIG. 9, FIG. 10

METHOD AND ARRANGEMENT FOR BUFFERING DATA

BACKGROUND OF THE INVENTION

My invention relates to data processing generally, and in particular, to data buffers.

In systems such as computer-driven data acquisition systems, data from a data source, or channel, being scanned is often generated at a much slower rate than the computer is capable of processing it. To make efficient use of the computer, therefore, it is necessary to scan a plurality of data sources and temporarily store the data therefrom in a memory until enough data has been collected from a given source to justify processing it. Such data processing arrangements are generally known as data buffers.

In a typical N-source data buffer arrangement, the data from a single source is unloaded from the buffer memory and processed after each scan cycle, i.e., after each source has been scanned once and a data word from each source has been stored in the buffer memory. Since each source is thus scanned N times between successive processings of the data therefrom, N buffer memory cells for each source, or a total of $N^2$ cells, are typically provided. However, no more than $(N^2+N)/2$ of the $N^2$ cells contain data words at any given time because at any point in the buffering process, the buffer memory will have stored therein only one data word from the most recently "unloaded" source, two from the second most recently "unloaded" source, and so forth. This would seem to indicate that, at most, a data buffer would require $(N^2+N)/2$ memory cells to buffer data from N sources. However, in known data buffer arrangements it will be appreciated that a different $(N^2+N)/2$ cells contain data at different times.

Although in typical data buffer arrangements the data from a given source is processed after each scan cycle, other arrangements are known for processing such data after a plurality, J, of scan cycles has occurred. Thus $J \times N^2$ buffer memory cells are required in these arrangements even though only $J \times (N^2+N)/2$ cells thereof contain data at any given time.

SUMMARY OF THE INVENTION

Accordingly, a general object of the present invention is to provide an improved data processor and data processing method.

A more specific object of the invention is to provide an improved data buffer and data buffering method.

Another object of the invention is to provide a data buffer which utilizes fewer buffer memory cells than heretofore required.

Yet another object of the invention is to provide an improved arrangement and method for addressing the memory cells of a data buffer.

In an illustrative data processor achieving these and other objects, N memory cells are respectively associated with and adapted for storing data from a different one of N data sources and, in accordance with the invention, $(N^2-N)/2$ memory cells are each associated with and adapted for storing data from a different two of the sources alternately. There is thus provided an illustrative data buffer which utilizes only $(N^2+N)/2$ memory cells, a saving in memory requirements of approximately 50 percent over known buffers.

The present data buffer operates in a sequence of processing, or buffer, cycles each comprising two buffer operations, viz., unloading and loading. At the start of a given cycle, each of the N cells associated with a selected one of the data sources contains a data word from that source. These N cells are unloaded. The N sources are scanned and the data word acquired from each source is loaded into a just-unloaded memory cell, thereby completing the cycle. The above-discussed association between the data sources and particular ones of the memory cells ensures that the N memory cells unloaded during each cycle are respectively associated with and adapted for storing data from a different one of the N sources. Thus as a data word is acquired from each source, it can be loaded into a cell associated with that source. In the next buffer cycle N memory cells associated with a second one of the data sources contain data from that second source. These N cells are unloaded, the process being repeated through subsequent buffer cycles.

The $(N^2+N)/2$ memory cells of the present data buffer may be conceptually regarded as being arranged in a right triangle configuration. The cells to be unloaded and reloaded during each buffer cycle, as described above, are then located by going across a row of cells and then down the column of cells including the last cell of the row. In accordance with an aspect of the invention, this "across and down" addressing method may be implemented in a data buffer utilizing a random access memory by associating the cells of the memory with respective numerical addresses and extending an appropriate address sequence to the memory.

When the buffer memory is both loaded and unloaded in accordance with the "across and down" method, the data words from each source will not, in general, be unloaded from the buffer in the same order in which they were loaded therein. In accordance with another aspect of the invention, the data word order can be preserved by loading the buffer via the "across and down" method and unloading it via a "down and across" addressing method in which column cells are unloaded before row cells.

The data buffering method of the present invention can be performed by data buffer apparatus specifically designed for that purpose. Advantageously, in accordance with a feature of the invention, the present data buffering method may alternatively be performed by a general purpose digital computer using its hardware and operating under the control of an appropriate computer program.

BRIEF DESCRIPTION OF THE DRAWING

A clear understanding of the invention may be gained from a consideration of the following description and accompanying drawing in which:

FIG. 2 is arranged to the right of FIG. 1, a data buffer embodying the principles of the present invention;

FIGS. 3–10 depict the status of the buffer memory of the illustrative embodiment during N, illustratively four, successive buffer cycles.

GENERAL DESCRIPTION

Figure 1:
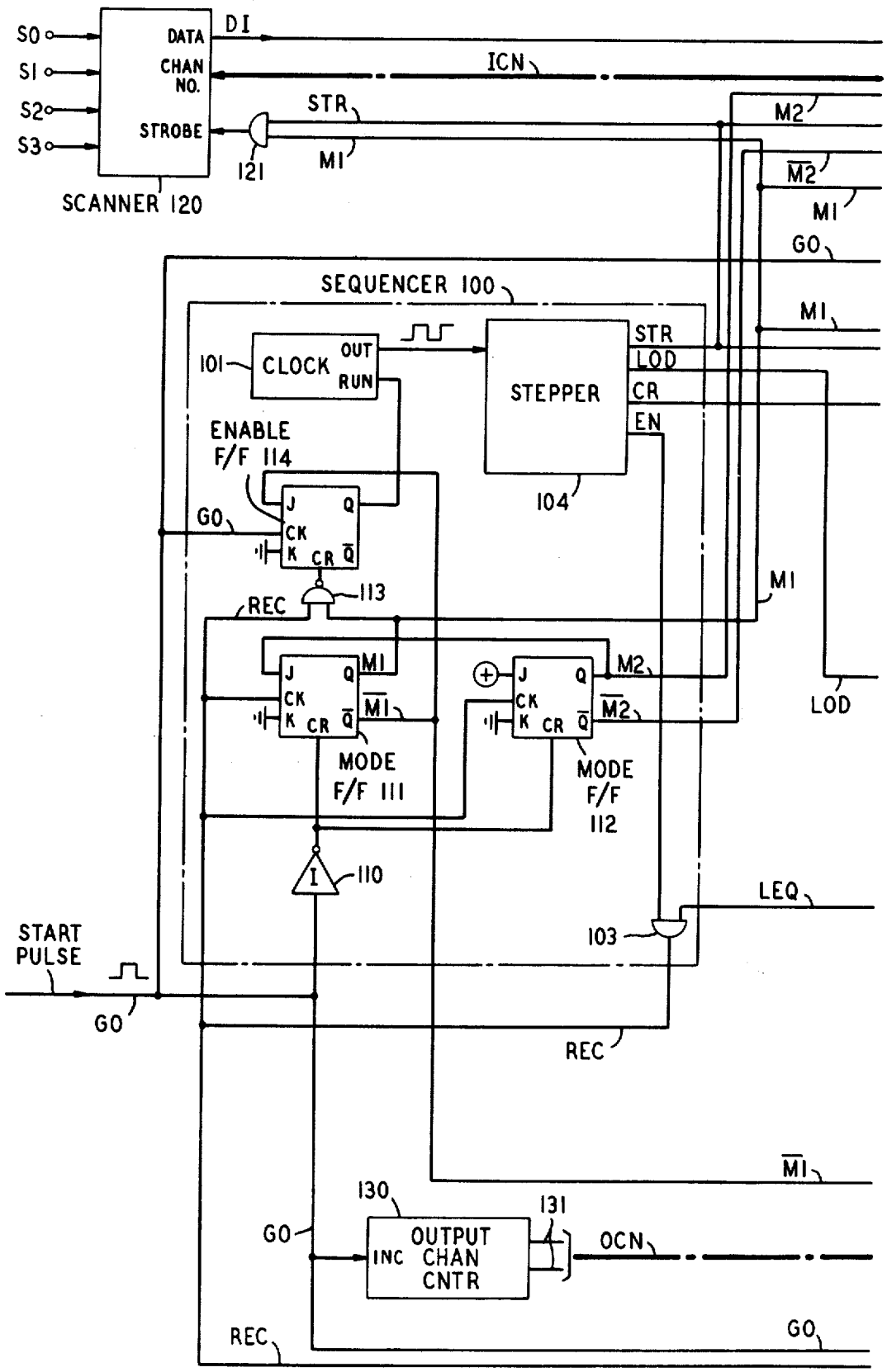
FIGS. 1 and 2 depict, when
Figure 2:
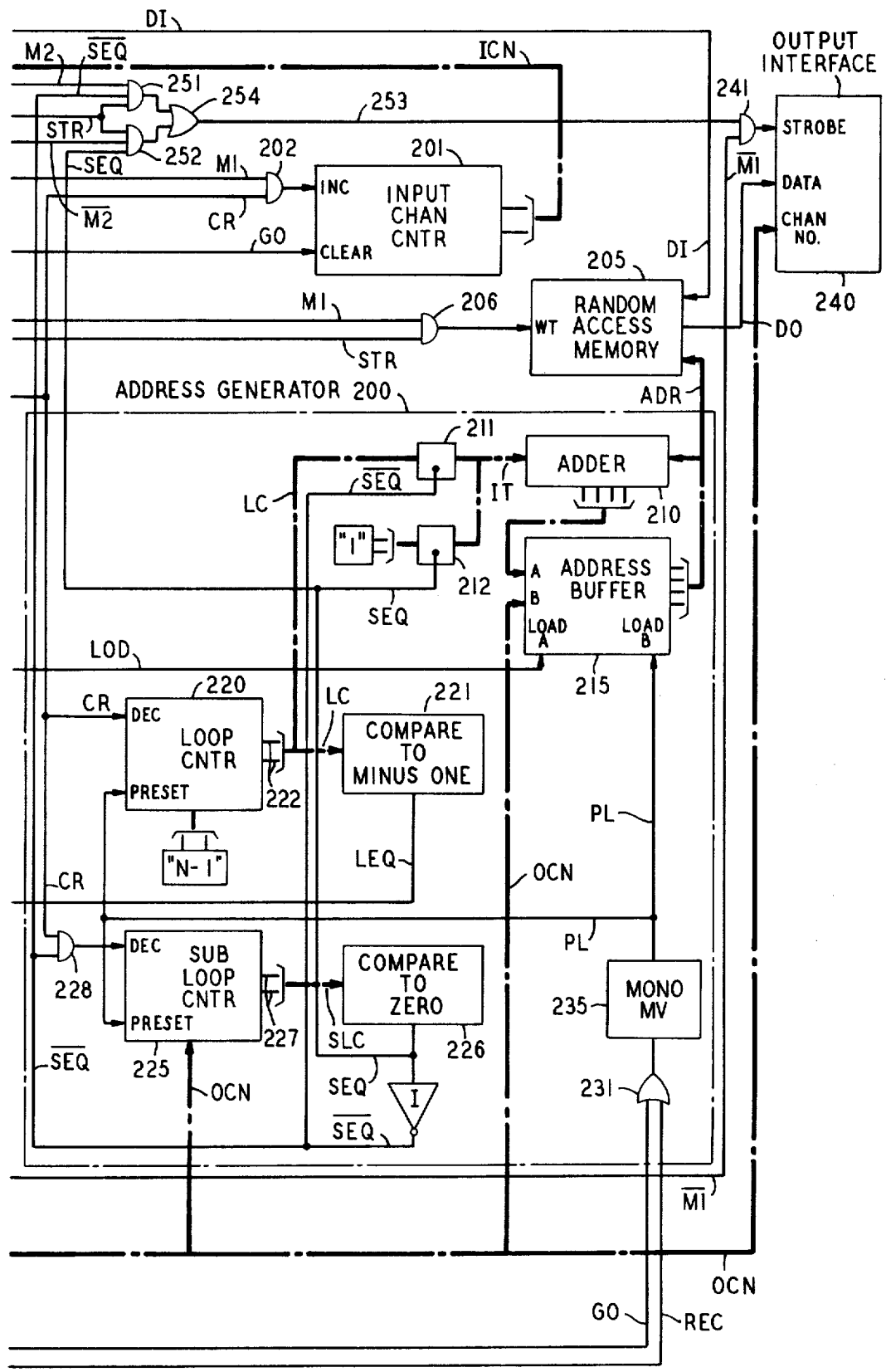

In the data buffer of FIGS. 1 and 2, data from each of (illustratively) four data sources, or channels, S0, S1, S2 and S3 is provided at scanner 120. This data is stored in random access memory 205 until enough data from a given source has been collected to warrant further processing thereof. At that time, all the data from the given source is unloaded from memroy 205 and transferred to output interface 240, from which it may be processed further in any desired manner.

Data is loaded into and unloaded from memory 205 by apparatus including sequencer 100 and address generator 200. The latter, operating under the control of the former, generates numerical addresses which are extended to memory 205 over cable ADR. These numerical addresses identify respective memory cells in memory 205 and indicate the particular cell into which data on data input lead DI is to be loaded, or from which data is to be unloaded and extended to interface 240 via data output lead DO.

The data buffer of the present invention comprises $(N^2+N)/2$ memory cells. Thus, as depicted in FIGS. 3–10, memory 205 for the four-source illustrative embodiment comprises ten memory cells C0, C1 ... C9. As shown in the following table, N, i.e., four, of the cells are adapted for storing data exclusively from a different one of sources S0, S1, S2 and S3, while each of the other $(N^2-N)/2$, i.e., six, cells is adapted for storing data from a different two of the data sources alternately. In particular,

| cell | | source(s) |
|---|---|---|
| C0 | stores data from | S0 |
| C1 | " | S0, S1 |
| C2 | " | S0, S2 |
| C3 | " | S0, S3 |
| C4 | " | S1 |
| C5 | " | S1, S2 |
| C6 | " | S1, S3 |
| C7 | " | S2 |
| C8 | " | S2, S3 |
| C9 | " | S3 |

Figures 3, 4, 5, 6, 7, 8, 9, 10:
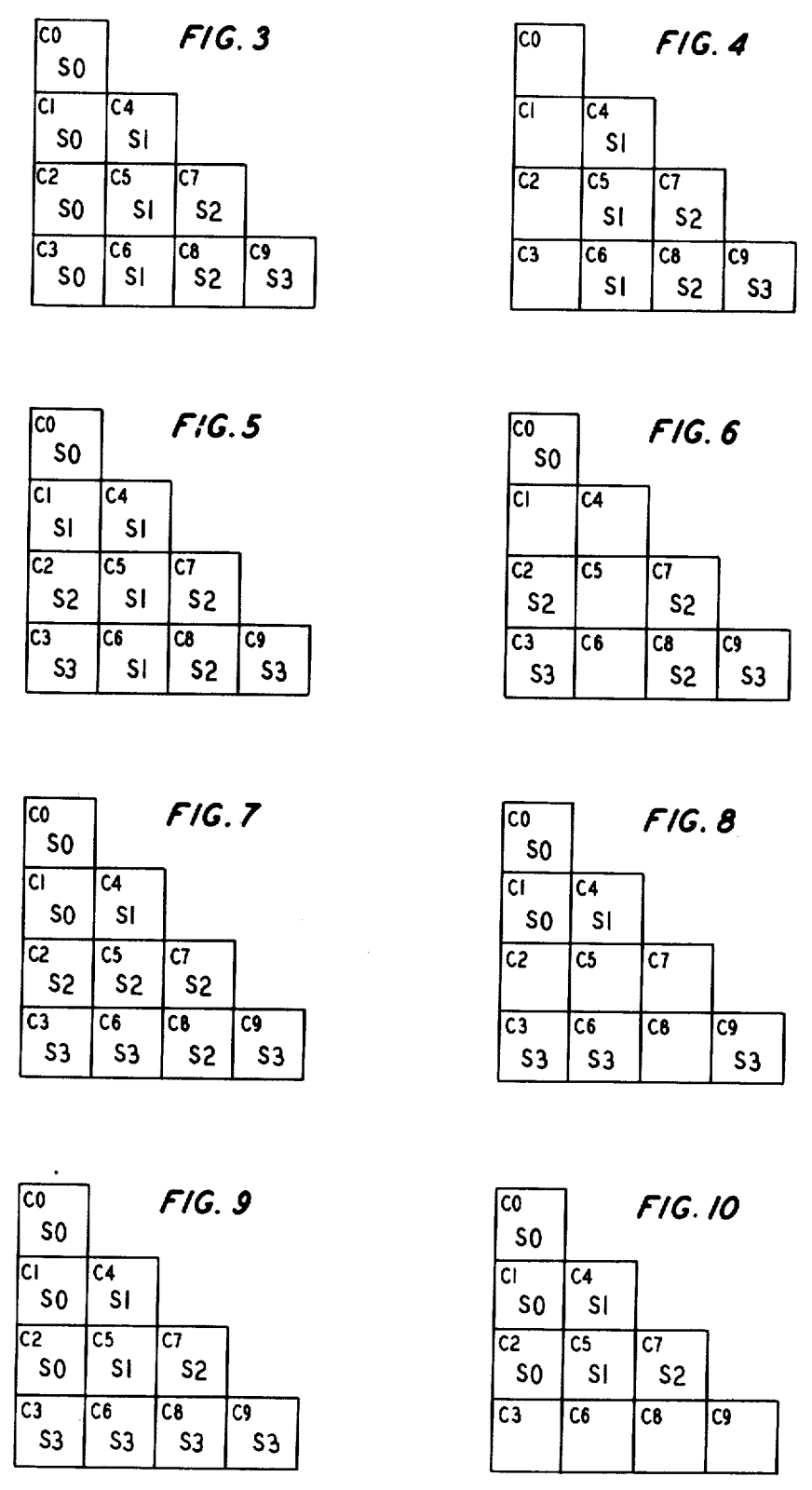

FIGS. 3–10 depict the status of memory 205 through an illustrative four buffer operating cycles. In FIG. 3 four data words from source S0 are shown stored in cells C0, C1, C2 and C3, respectively, as indicated by an "S0" in each of these cells. Three words from source S1 are stored in cells C4, C5 and C6, respectively; two words from source S2 are stored in cells C7 and C8, respectively; and one word from source S3 is stored in cell C9.

During the unloading portion of the next buffer cycle, cells C0, C1, C2 and C3 are addressed by generator 200 and unloaded as shown in FIG. 4, and the data words from source S0 stored therein are transferred over lead DO to output interface 240. Unloaded cells C0, C1, C2 and C3 are adapted respectively for storing data from sources S0, S1, S2 and S3 (see the above table). Thus when sources S0 ... S3 are scanned subsequently by scanner 120 during the loading portion of the buffer cycle, the data from each source is loaded into an associated unloaded cell, as depicted in FIG. 5.

Upon completion of the just-described buffer cycle, cells C1, C4, C5 and C6 each contain a data word from source S1. These cells are unloaded during the next cycle, as shown in FIG. 6. Sources S0 ... S3 are scanned again and cells C1, C4, C5 and C6, respectively adapted for storing data from a different one of the sources S0 ... S3, are loaded as shown in FIG. 7. Cells C2, C5, C7 and C8, at this point, each contain a data word from source S2. These cells are unloaded during the succeeding cycle, as shown in FIG. 8, and then reloaded as shown in FIG. 9. Thus, cells C3, C6, C8 and C9 each contain a data word from source S3. As shown in FIG. 10, these cells are unloaded during the last of the four illustrative cycles depicted and are then reloaded, memory 205 being returned to the status shown in FIG. 3.

If cells C0 ... C9 are conceptually regarded as being arranged in the right triangle configuration shown in FIGS. 3–10, the cells to be addressed during a selected buffer cycle are located by going across a row of cells from left to right and then down the last column of cells. Thus in FIGS. 7 and 8, for example, the cells storing data from source S2 are located by going across the row comprising cells C2 and C5 and then down the column comprising cells C7 and C8.

In accordance with a feature of the invention, this "across and down" addressing method is realized in a data buffer utilizing random access memory 205 (which has no particular spatial cell arrangement) by associating the memory cells with respective numerical addresses which are sequential multiples of a predetermined number, Z, and extending an appropriate address sequence to the memory.

The $(N^2+N)/2$ memory cells in memory 205 may be regarded for addressing purposes as comprising an ordered succession of N groups, illustratively columns, of memory cells, the $J^{th}$ group comprising an ordered succession of $(N-J+1)$ cells. Thus in the illustrative embodiment, the first group comprises the four cells C0, C1, C2, C3, the second group comprises the three cells C4, C5, C6 and so forth. The cells addressed during the $S^{th}$ buffer cycle are the $(S-J+1)^{th}$ cell in the $J^{th}$ group for each of the first $(S-1)$ groups plus all the cells in the $S^{th}$ group. Thus, the cells addressed during the third buffer cycle, for example, are the third and second cells of the first and second groups, respectively, i.e., cells C2 and C5, and all the cells of the third group, i.e., cells C7 and C8.

When a data buffer is both loaded and unloaded via the "across and down" addressing method in accordance with Eq. (1), the words from a given data source will not, in general, be unloaded in the same order that they were loaded into the buffer. This may be objectionable in certain applications. In such applications, the data may be loaded via the "across and down" addressing method of Eq. (1) and unloaded via a "down and across" addressing method in which the column cells are unloaded before the row cells. Reference is made to FIGS. 7 and 8, for example. The data from source S2 may be unloaded by first unloading the column comprising cells C7 and C8 and then unloading the row comprising cells C2 and C5. The data words from source S2 will then be unloaded from memory 205 in the order in which they were loaded therein.

The sequence of addresses for the "down and across" unloading method is provided illustratively by cycling address generator 200 through the "across and down" sequence twice. During the first cycling of address generator 200, the addresses corresponding to the row cells, e.g., cells C2 and C5 in FIG. 7, are ignored. Thus the column, or "down", cells C7 and C8 are the first to be unloaded. During the second cycling of generator 200, the addresses corresponding to the column cells are ignored so that the row, or "across", cells are unloaded but the system does not attempt to unload the column cells a second time.

An illustrative data buffering method embodying the principles of the present invention, as described above, is depicted in flowchart form in FIGS. 11 and 12. As will become evident, the steps of the illustrative method of FIGS. 11 and 12 closely correspond to operations performed in the buffer of FIGS. 1 and 2. In addition, the variable names used in the flowcharts correspond, where appropriate, to lead designations in FIGS. 1 and 2.

Figure 11:
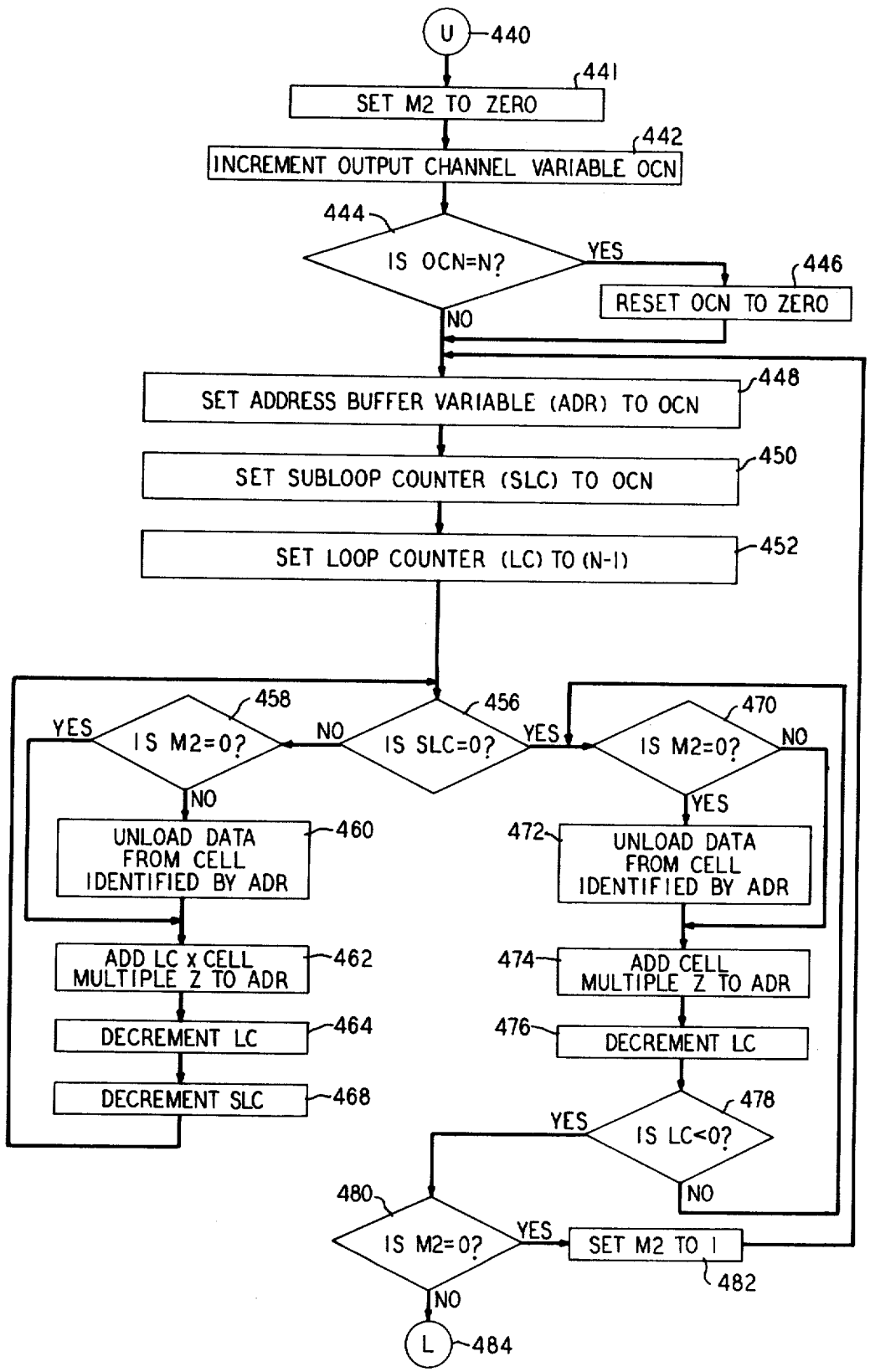
FIGS. 11–13 depict in flowchart from the steps of an illustrative data buffering method in accordance with the invention.
Figure 12:
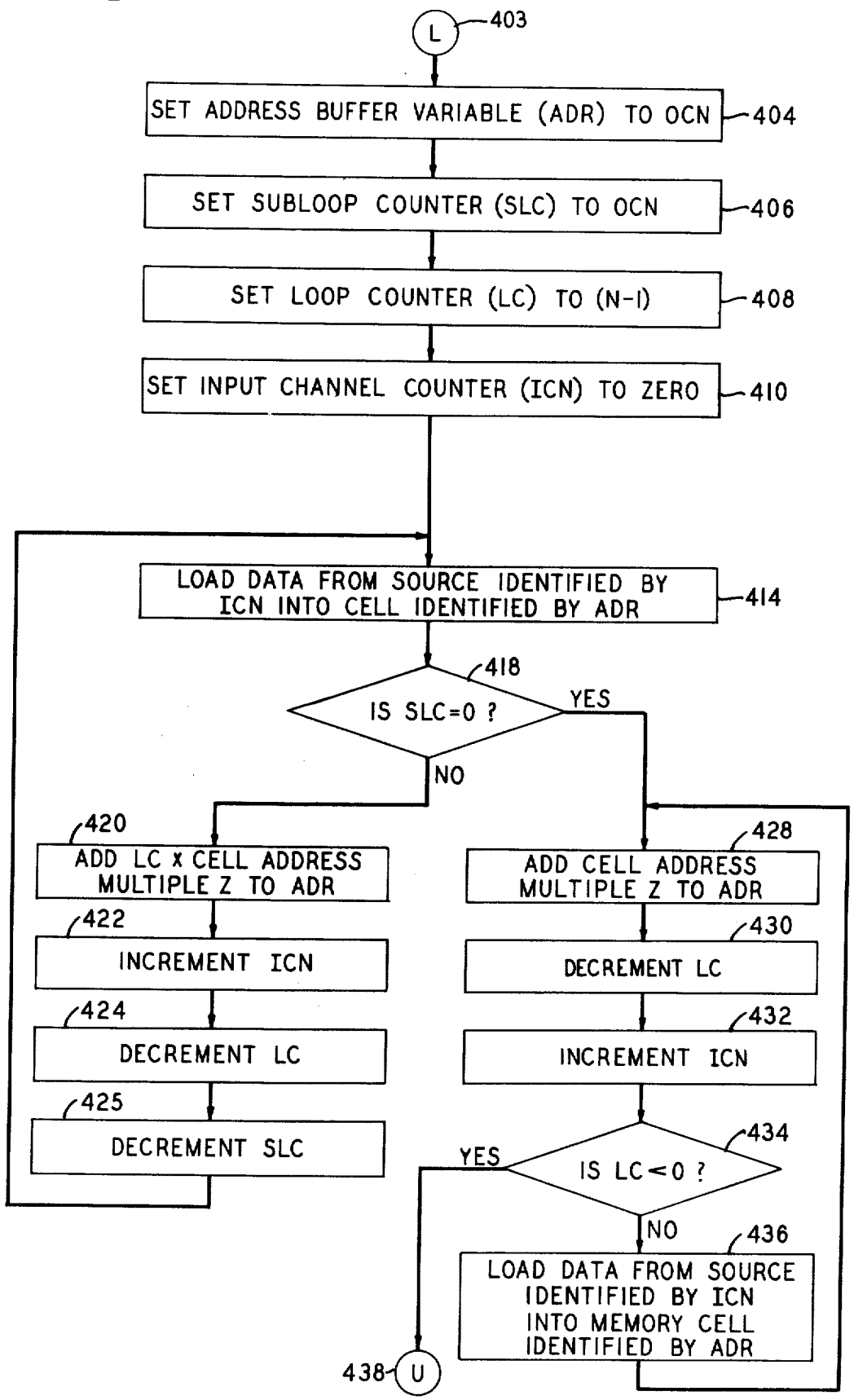

While the data buffering method of FIGS. 11 and 12 can be performed by apparatus specifically designed for that purpose, e.g., the illustrative buffer of FIGS. 1 and 2, the method may also be performed, advantageously, by a general purpose digital computer operating under the control of an appropriate computer program. An illustrative program embodying the principles of the invention is shown in the appendix hereof, as described more fully hereinafter. Moreover, the flowcharts shown in the drawing will enable those skilled in the art to readily devise other computer programs embodying the present data buffering method.

DETAILED DESCRIPTION

With the above general description in mind, consider now the following detailed description of the data buffer of FIGS. 1 and 2 and of the data buffering method performed thereby shown in FIGS. 11 and 12. The data buffering cycles described briefly above are controlled by sequencer 100 which illustratively includes clock 101 and stepper 104. The latter operates in response to a clock signal generated by the former to sequentially pulse leads STR, LOD, CR and EN. As described more fully hereinafter, the pulses on these leads control the operation of the various components of the data buffer including scanner 120, address generator 200 and output interface 240.

Sequencer 100 further includes mode flip-flops 111 and 112 and enable flip-flop 114. The state of mode flip-flop 111 at any given time determines whether the buffer is in its load or unload mode, i.e., whether data is to be loaded into memory 205 or unloaded therefrom. Flip-flop 112 operates in conjunction with comparator 226 in address generator 200 to indicate those addresses generated by generator 200 which are to be ignored, as discussed above, to implement the "down and across" addressing method. Flip-flop 114 is operative for enabling clock 101.

As mentioned above, the sequence of addresses of the "across and down" addressing method is generated by address generator 200. The latter includes, for example, address buffer 215 in which the current address is to be extended to memory 205 via address cable ADR is stored. Subsequent addresses to be extended to memory 205 are generated in turn by adder 210 and stored in buffer 215. For this purpose, adder 210 adds a numerical increment provided on increment cable IT to the current address provided by buffer 215 on cable ADR, and then loads the sum back into buffer 215.

The numerical increment provided on cable IT is determined by circuitry including loop counter 220 and subloop counter 225. At the start of each buffer load and unload operation, counters 220 and 225 are preset to respective initial counts. After each address has been generated and loaded into address buffer 215, counters 220 and 225 are decremented via terminals DEC. As long as the count in subloop counter 225 is greater than zero, as determined by comparator 226, the count in loop counter 220 is provided through gate 211 to increment cable IT. Once the count in subloop counter 225 reaches zero, however, a count of "1" is provided through gate 212 to increment cable IT.

The data buffer of FIGS. 1 and 2 also includes output channel counter 130 and input channel counter 201. The count in counter 130 indicates the source from which data currently being unloaded from memory 205 originated. That count is further advantageously utilized, as described hereinafter, to preset subloop counter 225 and to load an initial address into address buffer 215. The count in counter 201 similarly indicates which input source is to be scanned when scanner 120 is strobed to load data in memory 205.

The operation of the data buffer of FIGS. 1 and 2 through the illustrative scan cycles depicted in FIGS. 3–10 will now be described in detail with particular reference to the illustrative data buffering method of FIGS. 11 and 12. The buffer of FIGS. 1 and 2 may be utilized, for example, in a data acquisition system. The buffer is activated by a start pulse provided by the acquisition system on lead GO. The start pulse initiates a first buffer cycle during which cells C0 . . . C3 are unloaded during the unload buffer operation and then reloaded during the load buffer operation. The start pulse on lead GO is extended via inverter 110 to the CR (clear) inputs of mode flip-flops 111 and 112 in scanner 100. When flip-flops 111 and 112 are in the "clear" state, their Q outputs are low and their $\bar{Q}$ outputs are high.

The start pulse on lead GO is also extended to output channel counter 130 and input channel counter 201. Each of these counters may be of a known type such as that shown in *Integrated Electronics* by J. Millman and C. C. Halkias, McGraw-Hill, 1972, page 883. In particular, the output of counter 130 is a binary number represented by parallel bits on leads 131 of output channel number cable OCN. In the illustrative embodiment, output channel counter 130 is stepped through the count "0", "1", "2", "3" and back to "0" in response to successive positive-going transitions on lead GO. The count in counter 130 at each step identifies the source, or channel, from which data being unloaded originated. It is assumed that data from source S3 was unloaded during the immediately preceeding buffer cycles. Thus, this first pulse on lead GO steps counter 130 from a prior count of "3" to a count of "0".

The start pulse on lead GO is extended further to monostable multivibrator 235 in address generator 200 via OR gate 231. Monostable multivibrator 235 fires on the falling edge of the start pulse, extending a pulse on lead PL to the LOAD B input of address buffer 215, while the output channel number on cable OCN is extended to the B input thereof. A count of "0" is thus loaded into buffer 215. Address buffer 215 may be of a known type comprising, for example, a parallel in, parallel out register such as disclosed on page 634 of the above-cited text, modified, for example, by standard AND and OR circuitry to allow each stage of the register to be preset by the data on a selected one of two input leads. The address in buffer 215 is extended to the address input of memory 205 via address cable ADR.

The pulse on lead PL is also extended to the PRESET inputs of loop counter 220 and subloop counter 225. Counters 220 and 225 may each be of a known type such as shown on page 639 of the above-cited Millman and Halkias text, modified in standard fashion to include a counter presetting feature such as shown on page 883. The pulse on lead PL presets subloop counter 225 to the output channel number on cable OCN. Thus, a "0" is initially provided on leads 227 of subloop counter binary cable SLC. At the same time, loop counter 220 is preset to the number N-1, where, again, N is the number of data sources being buffered. Thus, in the illustrative embodiment, loop counter 220 is preset to "3", which number is provided in binary form on leads 222 of loop counter cable LC.

The start pulse on lead GO is also extended to the CK (clock) input of enable flip-flop 114. Thus when the start pulse falls, the Q output of enable flip-flop 114 goes high and enables clock 101. Clock 101 may be of any known type for generating a square-wave clock signal which is extended to stepper 104. The latter operates in response to successive positive-going transitions in the clock signal to pulse stepper output leads STR, LOD, CR and EN in sequence. Stepper 104 may be, for example, a conventional ring counter of the type disclosed on page 635 of the above-cited text.

The signal generated by clock 101 begins on its negative half-cycle and the period of monostable multivibrator 235 is chosen to be less than the duration of a half-cycle of the clock signal. Thus, address buffer 215 is loaded and counters 220 and 225 are preset, as described above, when stepper 104 responds to the first positive-going transition of the clock signal by providing a pulse on strobe lead STR.

As mentioned earlier, operational steps performed by the data buffer of FIGS. 1 and 2 closely correspond to steps of the illustrative data buffering method of FIGS. 11 and 12. In particular, operational steps of the unload operation being described correspond to steps of the unloading routine of FIG. 11. Thus the first step of the FIG. 11 routine (after it is entered at circle 440) is to set the mode variable M2 to zero at block 441. This step corresponds to the above-described clearing of mode flip-flop 112 via the start pulse on lead GO. Output channel variable OCN is then incremented at block 442, corresponding to the incrementing of output channel counter 130. A test is made at block 444 of FIG. 11 to ascertain if variable OCN has been incremented to N. If so, variable OCN is reset to zero at block 446, corresponding to the above-described initial setting of counter 130 to "0".

Further correspondence to the operation of the data buffer of FIGS. 1 and 2 can be seen in the succeeding method steps in FIG. 11. In particular, address buffer variable ADR and subloop counter variable SLC are set to the value of output channel variable OCN at blocks 448 and 450, respectively, and loop counter variable LC is set to N-1 at block 452.

Proceeding now with a description of the data unloading operation, it may be noted that the data is unloaded, illustratively, in accordance with the above-described "down and across" addressing method to preserve the order of the data words derived from each source. As explained above, the sequence of addresses for the "down and across" method may be generated by cycling through the addresses of the "across and down" method twice. During the first cycle, addresses associated with row cells are ignored so that the column, or "down", cells are the first to be unloaded. During the second cycle, the addresses corresponding to the column cells are ignored so that the row, or "across", cells are unloaded but the column cells are not erroneously unloaded a second time.

In the unloading routine of FIG. 11, this technique is effectuated by the steps of blocks 456, 458, 460, 470 and 472. In accordance therewith, address buffer variable ADR is cycled through the "across and down" sequence twice and the cell identified by the current value of address variable ADR is unloaded only if variables SLC and M2 are both zero or are both nonzero. Initially, variables SLC and M2 both have the value "0" so that the routine of FIG. 11 passes through blocks 456 and 470 to block 472. Thus, cell C0, the cell identified by the current value of address variable ADR, is unloaded.

Returning to the data buffer of FIGS. 1 and 2, the circuitry for performing the corresponding operation therein includes AND gates 241, 251 and 252, OR gate 254 and compare-to-zero comparator 226. (Comparator 226, as well as comparator 221, discussed hereinbelow, may be of a known type such as disclosed on page 608 of the above-cited text.) At this point, the count in subloop counter 225 is "0" and mode flip-flop 112 is in its "clear" state. Thus the output of comparator 226 on lead SEQ is high and lead $\overline{M2}$, which extends from the $\overline{Q}$ output of mode flip-flop 112 to gate 252, is also high. Consequently, the pulse generated by stepper 104 on strobe lead STR enables gate 252, and output lead 253 of OR gate 254 goes high. Since mode flip-flop 111 is in its "clear" state, indicating unloading operation, lead $\overline{M1}$ is high, and AND gate 241 is enabled.

A signal is thus provided through gate 241 to the STROBE input of output interface 240, enabling the data on output lead DO of memory 205 to be unloaded into interface 240 at its DATA input. Since this is the first buffer cycle in the current group of four buffer cycles, the address associated with the first cell in memory 205 to be unloaded is "0". This is the address presently stored in address buffer 215 and provided on cable ADR. Thus the data word in cell C0 is unloaded to output interface 240. The "0" on channel number cable OCN provided to the CHANnel NO. input of output interface 240 indicates that this data word is from source S0.

Returning now to the unloading steps of FIG. 11, the address associated with the next memory cell to be unloaded is generated at block 474 by adding the cell multiple Z to address variable ADR. The illustrative value of Z is "1" since the addresses associated with cells C0 ... C9 of memory 205 are sequential multiples of "1". The current value of address variable ADR is "0". The address associated with the next memory cell to be unloaded is, in fact, that sum, viz. "1".

In corresponding fashion, a "1" is loaded into address buffer 215. Since the count in subloop counter 225 is "0", output lead SEQ of comparator 226 is high and its complementary lead $\overline{SEQ}$ is low. These leads respectively extend to the enable inputs of gates 212 and 211 which are, accordingly, enabled and disabled, respectively. (Gates 211 and 212 may be, for example, parallel in, parallel out registers, of a known type such as that disclosed on page 634 of the above-cited text.) Since gate 212 is enabled, a binary "1", the illustrative value of Z, is extended to a first input of adder 210 via increment cable IT. Adder 210 adds that "1" to the address on cable ADR, now "0", and extends the sum, "1", to the A input of buffer 215. Stepper 104 at this point provides a pulse on lead LOD to the LOAD A input of address buffer 215, and the "1" at the A input is loaded therein.

Referring again to FIG. 11, the next steps of the unloading operation are to decrement loop counter variable LC at block 476 and compare it to zero at block 478. If, as is now the case, variable LC is not less than zero, transfer is made to block 470 and thence to block 472, at which the cell identified by the new value of address variable ADR, cell C1, is unloaded.

Correspondingly in the buffer of FIGS. 1 and 2, a pulse from stepper 104 on counter pulsing lead CR is extended to the DECrement input of loop counter 220, decrementing loop counter 220 to "2". Since lead $\overline{SEQ}$ is low, AND gate 228 is disabled, and the count in subloop counter 225 remains at "0". Output lead LEQ of compare-to-minus-one comparator 221 is low, indicating that the count in loop counter 220 is not "−1", i.e., not less than zero, at this time. Thus AND gate 103 is disabled and recycle lead REC remains low when the pulse next provided by stepper 104 appears on lead EN. Another four-pulse stepping sequence begins with the next pulse on strobe lead STR, enabling gate 241 to strobe output interface 240 a second time. The word in cell C1 is read into interface 240, and the number on channel number lead OCN, still "0", indicates that the data from cell C1 was derived from source S0.

Lead SEQ from comparator 226 is still high. Thus a binary "1" is again provided to adder 210 on increment lead IT and the next pulse on lead LOD loads a "2" into address buffer 215 (corresponding to block 474 in FIG. 11). Loop counter 220 is decremented to "1" by the pulse on counter pulsing lead CR (block 476). Lead LEQ from comparator 221 is still low so that gate 103 is again nonresponsive to the pulse on lead EN.

Stepper 104 sequences pulses on its four output leads third and fourth times to complete the first cycle of the unloading operation. During the third stepper sequence, cell C2 is unloaded (block 472), a "3" is stored in address buffer 215 (block 474) and loop counter 220 is decremented to "0" (block 476). During the fourth stepper sequence, cell C3 is unloaded (block 472), a "4" (which will not be used) is stored in address buffer 215 (block 474), and loop counter 220 is decremented to "−1" (block 476).

Referring again to FIG. 11, loop counter variable LC is now less than "0" and variable M2 is still equal to "0". Thus the routine of FIG. 11 now passes through blocks 478 and 480 to block 482. Variable M2 is set to "1", indicating that the second cycling through the "across and down" sequence is to begin. The routine then returns to block 448 to reset variables ADR, SLC and LC to their previous initial values.

Similarly in the data buffer of FIGS. 1 and 2, the pulse on lead EN during the fourth stepper sequence enables gate 103 since lead LEQ from comparator 221 is high. The positive transition thus provided on lead REC is extended to the CK (clock) inputs of mode flip-flops 111 and 112. The Q output of flip-flop 112 is connected to the J input of flip-flop 111. Since the output of flip-flop 112 was previously low, only flip-flop 112 changes from its "clear" to its "set" state in response to the pulse at its CK input. Lead M2 goes high and lead $\overline{M2}$ goes low. The $\overline{Q}$ output of flip-flop 111 is connected to the J input of flip-flop 114 via lead $\overline{M1}$. Thus the Q output of flip-flop 114 remains high and clock 101 remains enabled. The pulse on recycle lead REC is also extended to monostable multivibrator 235 via OR gate 231. Monostable multivibrator 235 refires, again presetting loop counter 220 and subloop counter 225 to "3" and "0", respectively, and again loading a "0" into address buffer 215.

Cells C0 . . . C3 are all column cells and all were unloaded during the just-described cycle of operation. Therefore, no unloading is to be performed during this second cycling through the "across and down" sequence. In particular, since the value of variable M2 in FIG. 11 is now nonzero while the value of subloop counter variable SLC is zero, the routine passes from block 456 to block 470 and thence to block 474, bypassing the unloading step of block 472. Correspondingly, in the buffer of FIGS. 1 and 2, gates 251 and 252 are both disabled since leads $\overline{SEQ}$ and $\overline{M2}$ are both low. Thus even though the addresses "0", "1", "2" and "3" are again generated, the pulses from stepper 104 on strobe lead STR do not cause any memory cells to be unloaded.

When the value of loop counter variable LC in the routine of FIG. 11 again reaches "−1", the routine transfers from block 478 through block 480 to circle 484. The latter represents both the exit point of the FIG. 11 unloading routine and the entry point of a routine such as that shown in FIG. 12 for loading a data word from each of the N sources into different ones of the just unloaded memory cells.

Similarly when the count in loop counter 220 reaches "−1", gate 103 is enabled and recycle lead REC goes high. Now both mode flip-flops 111 and 112 change state in response to the pulses at their respective CK inputs. Since flip-flop 111 is switched to its "set" state, the buffer is now in its load mode.

Cells C0, C1, C2 and C3 are now to be loaded. Loading of these cells is performed by the data buffer of FIGS. 1 and 2 substantially following the steps of the illustrative loading routine of FIG. 12. Thus, when lead REC goes high, a "0" is again loaded into address buffer 215 (block 404 in FIG. 12), and loop counter 220 and subloop counter 225 are again preset to "3" and "0", respectively (blocks 406 and 408).

As indicated at block 410 of FIG. 12, input channel counter variable ICN is set to zero at this point in the loading operation. Alternatively, this step may be performed earlier in the buffer cycle at the start of the unloading operation. Thus, for example, input channel counter 201 in the data buffer of FIGS. 1 and 2 was cleared to zero in response to the initial pulse on lead GO.

As indicated at block 414 in FIG. 12, cell C0 is now loaded with a data word from source S0. Thus in the data buffer of FIGS. 1 and 2, the Q output of mode flip-flop 111 on lead M1 is high, enabling AND gate 121. Therefore, successive pulses on lead STR through enabled gate 121 strobe scanner 120. Scanner 120 may be, for example, a 4-to-1 line multiplexer such as disclosed on page 613 of the above-cited text. Since lead $\overline{M1}$ is low, gate 241 is disabled and output interface 240 is not strobed. Input channel counter 201 extends a "0" to the CHANnel NO. input of scanner 120 via input channel cable ICN. This indicates to scanner 120 that source S0 is to be scanned in response to the pulse applied to the scanner STROBE input. The scanned data is extended to the DATA INPUT input of memory 205 via lead DI.

The pulse on strobe lead STR is also extended to the WT (write) input of memory 205 via gate 206, enabling the data on data input lead DI to be written, i.e., loaded, into the memory. Since the address on address cable ADR is "0", the data on lead DI from source S0 is loaded into cell C0.

The next pulses on buffer loading lead LOD and counter pulsing lead CR, respectively, function as described above. The former causes a "1" to be loaded into address buffer 215 (block 428) while the latter decrements loop counter 220 (block 430). Since lead M1 is high, the pulse on counter pulsing lead CR enables AND gate 202, incrementing input channel counter 201 to "1" (block 432). Thus when scanner 120 is strobed via the next pulse on strobe lead STR, data from source S1 is extended to memory 205 via lead DI and loaded into cell C1 (block 436).

The routine of FIG. 12 returns to block 428, and in similar fashion, a data word from source S2 is loaded into cell C2 and a data word fromm source S3 is loaded into cell C3. Exit is then made from block 434 back to the unloading routine of FIG. 11 via circle 438.

Correspondingly in FIGS. 1 and 2, leads REC and M1 are coupled to the two input leads of NAND gate 113, the output of which is coupled to the CR (clear) input of enable flip-flop 114. Thus, when lead REC goes high after cells C0 . . . C3 have all been reloaded, the Q output of flip-flop 114 goes low and clock 101 stops. This completes the first buffer cycle.

It may be noted at this point that where it may be desired to both load and unload data via the "across and down" method, a routine similar to that of FIG. 12, modified in an obvious manner to provide for unloading rather than loading of data, may be employed rather than that of FIG. 11.

In accordance with the "down and across" addressing scheme, the cells to be unloaded in the second buffer cycle are cells C4, C5, C6 and C1 in that order. The data buffer of FIGS. 1 and 2 operates to unload these cells in response to a second cycle start pulse provided on lead GO by the data acquisition system of which the buffer of FIGS. 1 and 2 is illustratively a part. This pulse clears mode flip-flop 111 and input channel counter 201. Flip-flop 112 is cleared (block 441). The start pulse also increments output channel counter 130 to "1" (block 442) and fires monostable multivibrator 235. A "1" is loaded into address buffer 215 (block 448) and subloop counter 225 is preset to "1" (block 450). Loop counter 220 is preset to "3" (block 452). Enable flip-flop 114 is clocked, enabling clock 101 and thus reoperating stepper 104.

Referring now to FIG. 11, it is seen that, at this time, subloop counter variable SLC is not equal to zero while variable M2 is equal to zero. The routine thus passes through blocks 456 and 458 to block 462, bypassing block 460. Thus cell C1, the cell identified by the current value of address variable ADR is not unloaded at this time. Similarly in the data buffer of FIGS. 1 and 2, comparator output lead SEQ and lead M2 are low so that gates 251 and 252 are both disabled. Thus the first pulse on strobe lead STR is ignored, even though memory 205 is addressed via a "1" on lead ADR, and the data in cell C1 is not unloaded.

Gates 211 and 212 are enabled and disabled, respectively. Thus the input to adder 210 on increment lead IT is "3", i.e., the count in loop counter 220. A "4" is loaded into address buffer 215 by the next pulse on buffer loading lead LOD (block 462 in FIG. 11). The subsequent pulse on counter pulsing lead CR decrements loop counter 220 (block 464) and subloop counter 225 (block 468) to "2" and "0", respectively.

Variables, SLC and M2 are now both equal to zero. Thus the routine of FIG. 11 passes through blocks 456 and 470 to block 472 to unload cell C4. Correspondingly in FIGS. 1 and 2, comparator output lead SEQ is now high, and the next pulse on strobe lead STR enables gate 252, lead $\overline{M2}$ also being high. Thus output interface 240 is strobed and as desired, the first cell to be unloaded in this, the second buffer cycle, is cell C4. The "1" on output channel load OCN indicates that the data being unloaded from cell C4 was derived from source S1.

With gates 211 and 212 once again disabled and enabled, respectively, adder 210 adds "1's" to the contents of address buffer 215 (block 474) during each of the next two stepper 104 sequences and cells C5 and C6 are unloaded. Recycle lead REC is thereafter pulsed and address generator 200 is readied to generate the address sequence "1", "4", "5", "6" on address lead ADR again.

In FIG. 11, variables SLC and M2 are now both nonzero. Thus the routine passes through blocks 456 and 458 to block 460 at which cell C1 is unloaded. Correspondingly in the buffer of FIGS. 1 and 2, lead M2 is now high so that the next pulse on strobe lead STR enables gate 251, strobing output interface 240 and unloading cell C1. A "4" is loaded into address buffer 215 by the pulse on buffer loading lead LOD (block 462), and loop counter 220 and subloop counter 225 are respectively decremented to "2" and "0" by the pulse on lead CR (blocks 464 and 468). With leads $\overline{SEQ}$ and $\overline{M2}$ low, gates 251 and 252 are disabled. Thus subsequent pulses on strobe lead STR, which would otherwise operate to unload cells C4, C5 and C6 for the second time, do not reach output interface 240 (the step of block 472 now being bypassed).

The unloading routine in FIG. 11 ultimately exits at circle 484 and the loading routine of FIG. 12 is then re-entered at circle 403. The initial value of subloop counter variable SLC in FIG. 12 is now nonzero so that after cell C1 is loaded at block 414, the routine passes through block 418 to block 420 at which address variable ADR becomes "4". Input channel variable ICN is incremented at block 422 and loop counter variable LC and subloop counter variable SLC are decremented at blocks 424 and 425, respectively. The routine returns to block 414 where cell C4 is loaded. Variable SLC is now equal to zero so that, as before, the routine now passes from block 418 to block 428 and thence to blocks 430, 432, 434 and 436.

Similarly in the data buffer of FIGS. 1 and 2, the most recent pulse on recycle lead REC readies address generator 200 to generate the addresses "1", "4", "5" and "6" a third time. Now leads M1 and $\overline{M1}$ are high and low, respectively, so that the buffer is in its load mode. Cells C1, C4, C5 and C6 are thus loaded with data words from sources S0, S1, S2 and S3, respectively, as shown in FIG. 7.

The second buffer cycle having been completed, clock 101 is again disabled. It is re-enabled by a third pulse on lead GO, which pulse initiates the third buffer cycle. In the third cycle, the cells storing data from source S2 are unloaded in the order C7, C8, C2 and C5.

Briefly, when the third buffer cycle begins, a "2" is loaded into subloop counter 225 and address buffer 215. Thus comparator output lead SEQ is initially low and with lead M2 also low, gates 251 and 252 are both disabled and the first pulse on strobe lead STR is ignored. Thereafter a "3", the count in loop counter 220, is added to the address in address buffer 215, storing a "5" therein. Loop counter 220 and subloop counter 225 are decremented to "2" and "1", respectively. Lead SEQ is still low so that the next pulse on strobe lead STR is also ignored. A "2" is then added to the address in address buffer 215, storing therein a "7". Loop counter 220 and subloop counter 225 are decremented to "1" and "0", respectively.

With lead SEQ now high, gate 252 is enabled by the next pulse on strobe lead STR and cell C7 is unloaded, followed by cells C8, C2 and C5 in a manner which will be evident from the foregoing discussion. These cells are then reloaded in the order C2, C5, C7 and C8, as shown in FIG. 9.

In the fourth buffer cycle, cells C9, C3, C6 and C8 are unloaded in that order and then reloaded in the order C3, C6, C8 and C9. Memory 205 is thus returned to the status of FIG. 3. Again, the operation of the buffer of FIGS. 1 and 2 to unload and reload these cells in the orders named will be evident from the foregoing discussion.

In the illustrative embodiment, data from a selected one of the data sources is unloaded from memory 205 after each scan cycle, i.e., after each source has been scanned once. Advantageously, the present invention can also be used when it is desired to unload the buffer memory after a plurality, J, of scan cycles has occurred. In such arrangements, J groups of $(N^2+N)/2$ cells such as cells C0 . . . C9 are provided. The data acquired during each one of the J scan cycles is loaded in accordance with the "across and down" addressing scheme into a different one of the J cell groups. N data words are then unloaded from each cell group, leaving $J \times N$ cells into which data can be loaded during the next J scan cycles.

The data buffer of FIGS. 1 and 2 as well as the unloading method of FIG. 11, unload data in accordance with the "down and across" addressing method by cycling through the "across and down" addressing sequence twice and selectively ignoring certain of the addresses generated. Where the present data buffering method is performed by apparatus specifically designed for that purpose, (e.g., the apparatus of FIGS. 1 and 2), this approach advantageously requires little in the way of additional circuitry over that required to implement the "across and down" method for both loading and unloading.

However, where the present data buffering method is implemented via computer program, it will generally be more advantageous to have a routine which generates the addresses of the "down and across" method directly. An illustrative unloding routine for this purpose is shown in FIG. 13 and may be used in conjunction with the loading routine of FIG. 12, for example.

Figure 13:
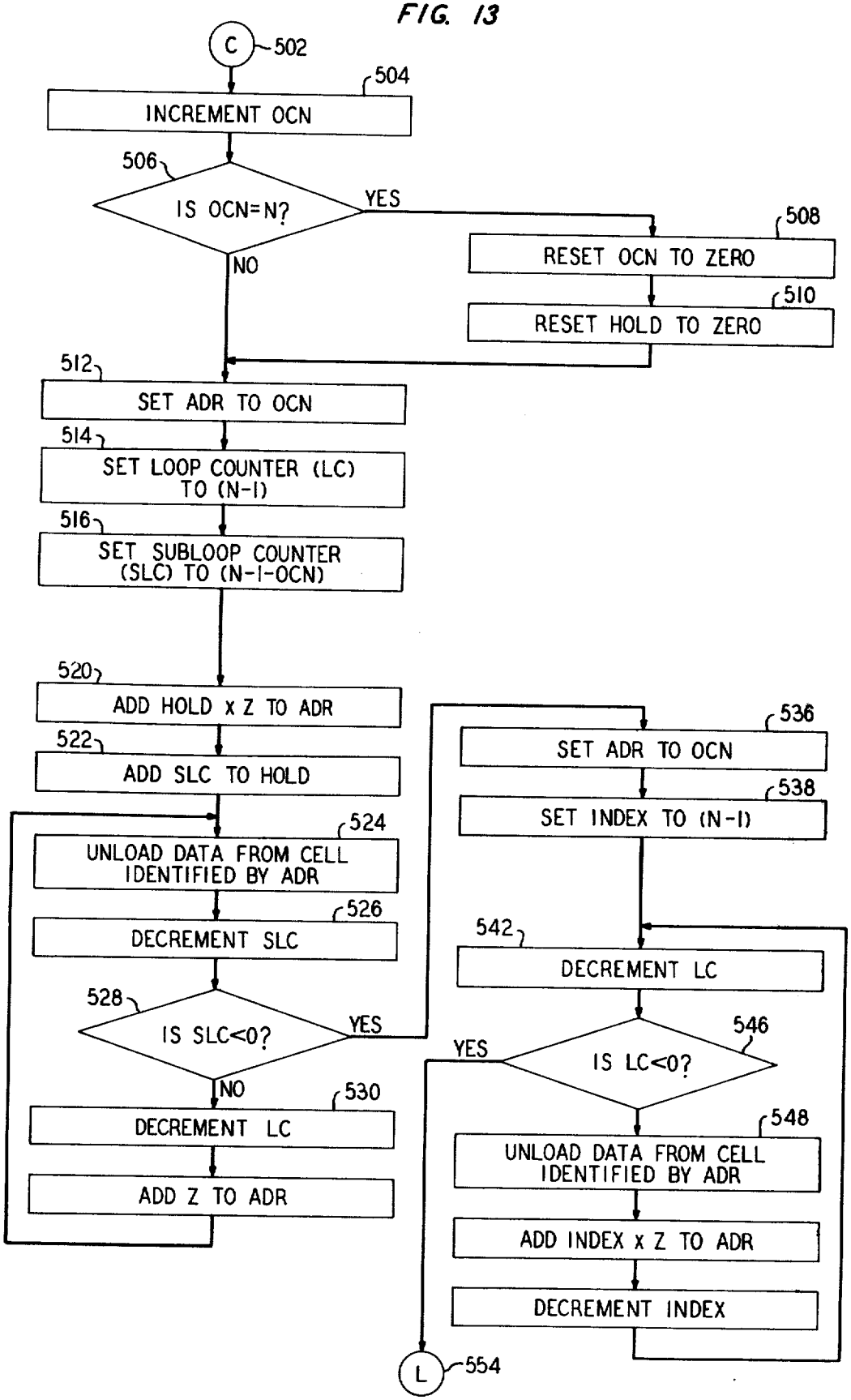

In the FIG. 13 routine, a variable called HOLD is computed dring each buffer cycle, i.e., during each pass through the routine. The value of the variable HOLD in each buffer cycle represents the numerical difference between the address associated with the first row cell and first column cell to be respectively addressed in the course of that buffer cycle. The first column address is then computed directly by adding variable HOLD to the easily determined, first row address.

The value of variable HOLD is computed in each buffer cycle by summing the previous value of variable HOLD with a counter variable which is initialized to a predetermined value in the first buffer cycle of each group of N cycles, and then decremented once during each of the N−1 succeeding buffer cycles.

An example will serve to illustrate the operation of the FIG. 13 unloading routine. Assume a buffer for four sources S0 . . . S3, having a buffer memory comprising the ten cells C0 . . . C9 of FIGS. 3–10. Assume further that when the routine is entered at circle 502 from circle 438, output channel variable OCN has the value "1". Variable OCN is thus incremented to "2" at block 504. This indicates that the data from source S2 stored in cells C7, C8, C2 and C5 is to be unloaded. Assume further that at the present time variable HOLD has the value "5". Since variable OCN is not equal to N, i.e., "4", blocks 508 and 510 are bypassed, and variables OCN and HOLD retain their present values rather than being reset to zero.

Address variable ADR is set to "2" at block 512. Loop counter variable LC is set to N−1, i.e., "3", at lock 514 while subloop counter variable SLC is set to (N−1−OCN), i.e., "1", at block 516. The value of loop counter variable LC is related to the number of cells still to be unloaded at any given time in each buffer cycle. The value of subloop counter variable SLC is related to the number of column cells still to be unloaded at any given time in each buffer cycle. Variable HOLD has the value "5". Z has the value "1". Thus, the computation at block 520 indicates that column cell C7 is the first cell to be unloaded during the current buffer cycle.

Since subloop counter variable SLC has the value "1", variable HOLD takes on a new value of "6" at block 522. (Looking ahead to the next pass through the FIG. 13 routine, it will be appreciated that address variable ADR will have the value "3" at block 516 and that a "6" will be added thereto at block 520, thus correctly indicating that in accordance with the "down and across" addressing method, the first cell to be unloaded during that next pass will be cell C9).

After cell C7 is unloaded at block 524, variable SLC is decremented to "0" at block 526 and compared to zero at block 528. Variable SLC less than zero indicates that all column cells have been unloaded and that the routine is to transfer to block 536 to begin unloading the appropriate row cells. However, since variable SLC is not less than zero at the present time, the routine continues to block 530 where variable LC is decremented to "2". The routine continues to block 530 where variable LC is decremented to "2". The routine returns to block 524. The next value of address variable ADR is computed by adding Z (in this case "1") to the previous value of address variable ADR, thereby setting address variable ADR to "8".

The routine transfers back to block 524 where cell C8 is unloaded. Since subloop counter variable SLC is decremented at block 526 to "−1," the routine transfers from block 528 to block 536 to unload the appropriate row cells.

In particular, address variable ADR is again set to "2" at block 536. A variable referred to as INDEX is initiated to "3" at block 536. Address variable ADR remains at "2" at block 538. Loop counter variable LC is decremented to "1" at block 524. Since loop counter variable LC is not less than zero at this time, the routine passes through block 546 to block 548 where the row cell C2 is unloaded. The next value of address variable ADR is calculated to be "5" at block 550. Variable INDEX is decremented to "2" at block 552.

The routine returns to block 542 where variable LC is decremented to "0". The routine again passes through block 546 to block 548, at which cell C5 is unloaded. The new value of address variable ADR, "7", is calculated at block 550. Cell C7 has already been unloaded, however. Thus, after variable INDEX has been decremented at block 552, variable LC has been decremented to "−1" at block 542 and the comparison at block 546 performed, the routine transfers to circle 554. The latter represents both the exit point for the FIG. 13 unloading routine and the re-entry point for the FIG. 12 loading routine (circle 403).

An appendix attached hereto shows a set of computer program instructions written in PAL-11, the assembly language for the PDP-11 computer manufactured by Digital Equipment Corporation. This set of instructions substantially embodies routines for loading and unloading data in accordance with the "across and down" method of the present invention. Advantageously, the buffer memory utilized by the appendixed program comprises a plurality of buffer cell groups each having $(N^2+N)/2$ cells. Thus as discussed above, each source can be scanned a plurality of times before the data from one of them is unloaded.

The present invention has been described above as a "data buffering" method and arrangement. However, it will be appreciated by those skilled in the art that in certain contexts, terms such as "assembling" and "byte-at-a-time multiplexing" may also be used in referring to the described method and arrangement. The present invention is thus not limited to data buffering per se, but may be used in any number of applications in which data signals, each derived from a different one of a plurality of data sources, are loaded into a memory and a plurality of data signals derived from a selected one of the sources and previously loaded into the memory are thereafter unloaded from the memory.

Moreover, it will be appreciated that the buffering method of the present invention may also be implemented in an inverse sense, i.e., a plurality of data signals derived from a selected one of the data sources are loaded into the memory and data signals each derived from different ones of the data sources and previously loaded into the memory are thereafter unloaded from the memory. This inverse buffering method may be implemented in accordance with the present invention by unloading data from the memory via "across and down" addressing as described hereinabove. The order of addresses for the loading operation of the inverse buffering method is the order defined by the $(S+1)^{st}$ through the $N^{th}$ addresses of the "across the down" addressing method followed by the first through the $S^{th}$ addresses thereof.

Thus it will be appreciated that the specific embodiments of the present invention disclosed and described herein are merely illustrative of the principles of the invention. Many and varied other arrangements in accordance with the invention may be made by those skilled in the art without departing from the spirit and scope thereof.

APPENDIX

```
.CSECT SCAN
.GLOBL PDTMOT
.GLOBL BMEM,MEMEX1,MEMEX2,MEMEX3
.GLOBL ADBKTB,ADCHAT,ADCCNT,BUFFAD
.GLOBL
BSAT,CUC,CHK,SCANO,CHANL,UPDEVEN,SCNADR
.GLOBL ABCVST
.GLOBL NXTAD2,NXTADD,EOPAD,ADRQ1A

SCAN:     MOV    R0,-(SP)
          MOV    R1,-(SP)
          MOV    R2,-(SP)
          MOV    MEMEX2,-(SP)
          MOV    MEMEX3,-(SP)
          MOV    SCANO,R0
          MOV    BSAT(R0),R2
          MOVB   BMEM(R0),MEMEX2
          MOVB   BMEN+1(R0),MEMEX3
          MOV    #SCNADR,R1
          ADD    CUC,R2
          MOV    AMAXCHAN,R0
SCN00:    CMP    R0,CHK
```

APPENDIX -continued

```
.CSECT SCAN
.GLOBL PDTMOT
.GLOBL BMEM,MEMEX1,MEMEX2,MEMEX3
.GLOBL ADBKTB,ADCHAT,ADCCNT,BUFFAD
.GLOBL
BSAT,CUC,CHK,SCANO,CHANL,UPDEVEN,SCNADR
.GLOBL ABCVST
.GLOBL NXTAD2,NXTADD,EOPAD,ADRQ1A

BEQ    SCN05
          MOV    at (R1)+,at R2
          ADD    R0,R2
          TST    -(R0)
          BR     SCN00
SCN05:    BMI    T3
          MOV    at (R1)+,(R2)+
          SUB    #2,R0
          BR     SCN05
T3:       MOV    (SP)+,R3
          MOV    (SP)+,MEMEX3
          MOV    (SP)+,MEMEX2
          SUA    #2,SCANO
          BGE    SON10
          BIT    #2,CUC
          BNE    SONEND
          ADD    #2,CUC
          JMP    UPDEVEN
SCNEND:   CLR    at #164404
SCN10:    MOV    (SP)+,R2
          MOV    (SP)+,R1
          MOV    (SP)+,R0
          RTI
UPDODD:   MOV    CHANL,CUC
          MOV    DIWS+4,UPD10+2
          SUB    #60000-60,UPD10+2
UPDEVEN:  TST    SCANO
          BMI    UPD49
          JMP    UPER00
UPD49:    MOV    #10.,SCANO
          MOV    R3,-(SP)
          MOV    R4,-(SP)
          MOV    MEMEX1,-(SP)
          MOV    MEMEX2,-(SP)
          MOV    MEMEX3,-(SP)
          MOV    UPD10+2,UPD30+2
          MOV    #7,MEMEX1
          MOV    UPD10+2,R0
UPD50:    MOV    CUC,R1
          MOV    (SP)+,-(R2)
          MOV    CUC,R0
UPD01:    MOV    AMAXCHAN,R1
          SUB    R0,R1
          MOV    R1,CHK
          MOV    #10.,R3
UPD00:    MOV    AMAXCHAN,R2
          MOV    CUC,R0
          ADD    BSAT(R3),R0
          MOVB   BMEM(R3),MEMEX2
          MOVB   BMEM+1(R3),MEMEX3
UPD05:    CMP    R1,R2
          BEQ    UPD20
          MOV    (R0),R4
          BLT    UPD15
          CMP    R4,#2000.
          BLT    UPD02
          MOV    4,R4
UPD02:    MOV    OTDCTB(R4),R4
UPD10:    INC    0(R4)
UPD15:    ADD    R2,R0
          TST    -(R2)
          BR     UPD05
UPD20:    TST    R2
UPD25:    BLT    UPDEXT
          MOV    (R0)+,R4
          BLT    UPD35
          CMP    R4,#2000.
          BLT    UPD03
          MOV    #4,R4
UPD03:    MOV    OTDCTB(R4),R4
UPD30:    INC    0(R4)
UPD35:    SUB    #2,R2
          BR     UPD25
```

APPENDIX -continued

```
.CSECT SCAN
.GLOBL PDTMOT
.GLOBL BMEM,MEMEX1,MEMEX2,MEMEX3
.GLOBL ADBKTB,ADCHAT,ADCCNT,BUFFAD
.GLOBL
BSAT,CUC,CHK,SCANO,CHANL,UPDEVEN,SCNADR
.GLOBL ABCVST .
.GLOBL NXTAD2,NXTADD,EOPAD,ADRQ1A
```

| UPER00 | ADD | #2048.,UPD10+2 |
| --- | --- | --- |
|  | MOV | #10.,SCANO |
|  | BR | UPER05 |
| UPDEXT: | CLR | at #PSW |
|  | SUB | #2,R3 |
|  | BGE | UPD00 |
|  | ADD | #2048., UPD10+2 |
| UPDACC: | MOV | (SP)+,MEMEX3 |
|  | MOV | (SP)+,MEMEX2 |
|  | MOV | (SP)+,MEMEX1 |
|  | MOV | (SP)+,R4 |
|  | MOV | (SP)+,R3 |
| UPER05: | MOV | (SP)+,R2 |
|  | MOV | (SP)+,R1 |
|  | MOV | (SP)+,R0 |
|  | RTI |  |

I claim:

1. A data buffer for buffering data from N data sources comprising
   an input channel counter (201),
   an output channel counter (130),
   a loop counter (220),
   a subloop counter (225),
   an address buffer (215),
   first and second mode flip-flops (111, 112) each having a clear state and a set state,
   signal lead means (GO) for receiving a start pulse, said start pulse clearing the count in said input channel counter to zero and incrementing the count in said output channel counter by unity,
   inverter means (110) operative in response to said start pulse for establishing each of said flip-flops in its clear state,
   first circuit means (231, 235) including a monstable multivibrator and operative in response to said start pulse for presetting the count in said loop counter to N−1, presetting the count in said subloop counter to said output channel number and loading the count in said output channel counter into said address buffer,
   second circuit means (101, 104, 114) operative subsequent to the operation of said first circuit means for repetitively generating sequences of first, second, third and fourth pulses,
   output strobe means (226, 241, 251, 252, 254) operative for generating an output interface strobe pulse in response to indiviual ones of said first pulses when said first and second flip-flops are in their clear states and the count in said subloop counter is zero, said output strobe means being further operative when said first flip-flop is in its clear state, said second flip-flop is in its set state, and the count in said subloop counter is other than zero,
   input strobe means (121, 206) operative for generating an input strobe pulse and a memory write pulse in response to individual ones of said first pulses when said first flip-flop is in its set state,
   a data input lead (DI),
   scanner means (120) operative in response to said input strobe pulse for providing on said data input lead data derived from an individual one of said sources identified by the count in said input channel counter,
   a random access memory (205) comprised of $(N^2+N)/2$ memory cells, each of said cells having an address which is a respective one of the integers 0 through $[(N^2+N)/2]-1$, said memory providing as an output the contents of an individual one of its memory cells having as its address the address currently in said address buffer, said memory being operative in response to said memory write pulse for entering data from said data input lead into said individual one of said cells,
   means (210, 211, 212, 226) operative in response to each of said second pulses for adding an increment to the address currently in said address buffer and for storing the sum in said address buffer, said increment being equal to the count in said loop counter when the count in said subloop counter is other than zero and being equal to unity when the count in said subloop counter is equal to zero,
   means (202) operative in response to individual ones of said third pulses for incrementing the count in said input channel counter by unity when said first flip-flop is in its set state,
   means (226, 228) operative in response to individual ones of said third pulses for decrementing the count in said subloop counter by unity if it is not equal to zero, each of said third pulses also decrementing the count in said loop counter by unity,
   means (103, 221) operative in response to individual ones of said fourth pulses for generating a recycle pulse when the count in said loop counter is equal to negative unity, said recycle pulse operating said first circuit means, switching the stage of said second flip-flop, and switching the state of said first flip-flop if said second flip-flop was in its set state prior to the generation of said recycle pulse, and
   means (113) operative in response to said recycle pulse for inhibiting further operation of said second circuit means if said first flip-flop was in its set state prior to the generation of said recycle pulse.

* * * * *